US006131160A

United States Patent [19]
Dillon et al.

[11] Patent Number: 6,131,160
[45] Date of Patent: Oct. 10, 2000

[54] METHOD AND APPARATUS FOR AN ADAPTER CARD PROVIDING CONDITIONAL ACCESS IN A COMMUNICATION SYSTEM

[75] Inventors: Douglas M. Dillon, Gaithersburg; Robert D. Cassagnol, Silver Spring, both of Md.

[73] Assignee: Hughes Electronics Corporation, El Segundo, Calif.

[21] Appl. No.: 09/288,986

[22] Filed: Apr. 9, 1999

Related U.S. Application Data

[62] Division of application No. 08/862,346, May 23, 1997, which is a division of application No. 08/557,398, Nov. 13, 1995, Pat. No. 5,652,795, which is a continuation-in-part of application No. 08/340,347, Nov. 14, 1994, abandoned.

[51] Int. Cl.[7] ........................................ H04L 9/00
[52] U.S. Cl. .......................... 713/162; 380/276; 380/278
[58] Field of Search ............................ 713/162; 380/278

[56] References Cited

U.S. PATENT DOCUMENTS

| | | | |
|---|---|---|---|
| Re. 33,189 | 3/1990 | Lee et al. .................................... | 380/20 |
| 4,135,156 | 1/1979 | Sanders, Jr. et al. ........................ | 325/4 |
| 4,358,672 | 11/1982 | Hyatt et al. ............................... | 235/380 |
| 4,538,073 | 8/1985 | Freige et al. ............................... | 307/33 |
| 4,599,647 | 7/1986 | George et al. ............................. | 358/122 |
| 4,636,879 | 1/1987 | Narita et al. ............................. | 360/72.2 |
| 4,680,688 | 7/1987 | Inou et al. ................................. | 363/21 |
| 4,720,873 | 1/1988 | Goodman et al. .......................... | 455/2 |
| 4,736,422 | 4/1988 | Mason ....................................... | 380/20 |
| 4,751,732 | 6/1988 | Kamitake .................................. | 380/20 |
| 4,777,657 | 10/1988 | Gillaspie ................................... | 455/186 |
| 4,794,919 | 1/1989 | Murray et al. ............................. | 380/20 |
| 4,802,215 | 1/1989 | Mason ....................................... | 380/21 |
| 4,829,569 | 5/1989 | Seth-Smith et al. ...................... | 380/10 |
| 4,876,737 | 10/1989 | Woodworth et al. ..................... | 455/12 |
| 4,918,653 | 4/1990 | Johri et al. ............................... | 364/900 |
| 4,937,866 | 6/1990 | Crowther et al. ......................... | 380/20 |
| 4,959,872 | 9/1990 | Imai et al. ................................ | 455/164 |
| 5,019,910 | 5/1991 | Filmer ...................................... | 358/188 |
| 5,029,207 | 7/1991 | Gammie .................................... | 380/10 |
| 5,038,265 | 8/1991 | Paladel ..................................... | 363/65 |
| 5,058,138 | 10/1991 | Figura et al. ............................. | 375/88 |
| 5,077,834 | 12/1991 | Andros et al. .......................... | 455/193 |
| 5,111,504 | 5/1992 | Esserman et al. ........................ | 380/21 |
| 5,126,728 | 6/1992 | Hall ...................................... | 340/825.3 |
| 5,131,010 | 7/1992 | Derrenge et al. ....................... | 375/100 |
| 5,237,610 | 8/1993 | Gammie et al. .......................... | 380/10 |
| 5,245,429 | 9/1993 | Virginio et al. ......................... | 358/142 |

(List continued on next page.)

*Primary Examiner*—Salvatore Cangialosi
*Attorney, Agent, or Firm*—Michael W. Sales; John T. Whelan

[57] ABSTRACT

A method and apparatus for an adapter card, for use in a computer, to provide conditional access by the computer to incoming data streams while maintaining the security of information by maintaining a listing of addresses corresponding to data streams which the computer is authorized to receive, receiving and determining the address of a frame, determining whether the frame address matches an address maintained in an Access Table, and processing and transmitting only those frames of data streams which the computer is authorized to receive.

30 Claims, 2 Drawing Sheets

U.S. PATENT DOCUMENTS

| | | | |
|---|---|---|---|
| 5,247,575 | 9/1993 | Sprague et al. | 380/9 |
| 5,266,922 | 11/1993 | Smith et al. | 340/525 |
| 5,301,358 | 4/1994 | Gaskill et al. | 455/56.1 |
| 5,319,705 | 6/1994 | Halter et al. | 380/4 |
| 5,319,707 | 6/1994 | Wasilewski et al. | 380/14 |
| 5,337,044 | 8/1994 | Folger et al. | 340/825.44 |
| 5,341,425 | 8/1994 | Wasilewski et al. | 380/20 |
| 5,347,304 | 9/1994 | Moura et al. | 348/12 |
| 5,359,367 | 10/1994 | Stockill | 348/552 |
| 5,367,571 | 11/1994 | Bowen et al. | 380/20 |
| 5,394,469 | 2/1995 | Nagel et al. | 380/4 |
| 5,400,401 | 3/1995 | Wasilewski et al. | 380/9 |
| 5,404,505 | 4/1995 | Levinson | 395/600 |
| 5,420,866 | 5/1995 | Wasilewski | 370/110.1 |
| 5,452,357 | 9/1995 | Naccahe | 380/25 |
| 5,481,609 | 1/1996 | Cohen et al. | 380/16 |
| 5,483,595 | 1/1996 | Owen | 380/23 |
| 5,497,420 | 3/1996 | Garneau et al. | 380/20 |
| 5,504,814 | 4/1996 | Miyahara | 380/4 |
| 5,506,904 | 4/1996 | Sheldrick et al. | 380/23 |
| 5,517,502 | 5/1996 | Bestler et al. | 370/94.2 |
| 5,532,914 | 7/1996 | Kageyama et al. | 363/50 |
| 5,568,554 | 10/1996 | Eastlake, III | 380/25 |
| 5,590,200 | 12/1996 | Nachman et al. | 380/46 |
| 5,592,173 | 1/1997 | Lau et al. | 342/357 |
| 5,602,920 | 2/1997 | Bestler et al. | 380/49 |
| 5,652,795 | 7/1997 | Dillon et al. | 380/25 |
| 5,699,384 | 12/1997 | Dillon | 375/316 |

METHOD AND APPARATUS FOR AN ADAPTER CARD PROVIDING CONDITIONAL ACCESS IN A COMMUNICATION SYSTEM

RELATED APPLICATIONS

This is a divisional of application Ser. No. 08/862,346 filed May 23, 1997 now pending, which is a divisional of 08/557,398, filed Nov. 13, 1995, U.S. Pat. No. 5,652,795, which itself is a CIP of 08/340,347 filed Nov. 14, 1994 now abandoned.

FIELD OF THE INVENTION

The present invention relates generally to the field of communications, and more specifically to conditional access by computers to data streams transmitted via satellite.

BACKGROUND OF THE INVENTION

Satellite communication has long been used to broadcast data to computers. In situations requiring the same data to be transmitted to multiple sites, satellite communication, which allows a single transmission of data to be received at multiple sites, can be more cost effective than terrestrial communication, which requires separate transmission to each site.

In the past, data broadcast via satellite to a computer typically was received by an external satellite receiver, which serially passed a single data stream to the computer through a serial adapter interface. An example of such a system is the Opportunistic Data File Broadcast system developed by Hughes Network Systems, which employs a Compression Labs Spectrum Saver satellite receiver to pass RS-422 serial data to high-speed adapters in computers at remote sites. This particular system has been used by financial institutions to broadcast financial data from central data centers to branch offices.

For commercial data broadcasts, conditional access technology enabling only authorized users to access the broadcast data is essential to ensure payment for the data. Conditional access is typically implemented by encrypting the broadcast data and providing the decryption keys only to authorized receivers. In prior satellite data communication systems, such as the Opportunistic Data File Broadcast system, conditional access functions have been performed by the external satellite receiver, which outputs a single decrypted data stream to the receiving computer. In these systems, conditional access is provided for only a single data stream. Thus, to access multiple data streams simultaneously transmitted would require users to have a complete set of receiving equipment for each data stream.

Another type of satellite communication system has been suggested in which an adapter card, insertable into a computer, enables satellite reception without the need for the external satellite receiver. Examples of such systems are disclosed in U.S. Pat. No. 4,777,657 to Gillaspie, U.S. Pat. No. 5,019,910 to Filmer, and U.S. Pat. No. 5,359,367 to Stockill.

However, these references fail to teach a system incorporating conditional access technology, and similarly fail to provide for simultaneous receipt of multiple data streams where the data streams are individually conditional access controlled. Furthermore, to the extent that the prior art discloses use of decryption hardware, none of the prior art systems extends the use of the hardware beyond decrypting an incoming broadcast data stream to providing encryption and decryption operations for the connected computer.

SUMMARY OF THE INVENTION

The present invention addresses the shortcomings of prior art systems by teaching a secure satellite communication system for providing subscribers with conditional access to broadcast satellite data through their computers. This system maintains the security of information by providing access only to authorized users, and provides an additional benefit by enabling users to concurrently receive and decrypt multiple data streams.

In a preferred embodiment, the present invention teaches a method for an adapter card, for use in a computer, to provide conditional access by the computer to input data, including data streams transmitted via satellite, wherein a data stream is comprised of at least one frame and each frame includes an address identifying the data stream. This method includes the steps of maintaining an Access Table, in which each table entry includes an address field for storing an address corresponding to a data stream which the computer is authorized to receive, receiving a frame and determining its address, and determining whether the frame address matches an address maintained in the Access Table in order to determine whether the computer has access to the data stream corresponding to the frame. If a match is not found, the adapter card discards the frame, but if a match is found, the adapter card processes and transmits the frame to the computer through a bus interface.

In a preferred embodiment, the adapter card additionally is capable of processing data transmitted from the computer.

In addition to the method described above, the present invention is also directed to an adapter card for use in a computer, for providing conditional access by the computer to input data including frames of data streams transmitted via satellite, wherein each data stream is comprised of at least one frame and each frame includes an address identifying the data stream. The adapter card includes a receiver for receiving a data stream frame, an Access Table, in which each table entry includes an address field for storing an address corresponding to a data stream which the computer is authorized to receive, an integrated filter/crypto (IFC) block for determining an address of the received frame and determining whether the frame address matches an address maintained in the Access Table, and a bus interface for enabling communication between the adapter card and the computer. If the IFC finds that the frame address does not match a table address, the IFC block discards the frame, but if it finds a match, the IFC block processes the frame into output data, to be transmitted to the computer via the bus interface. The IFC preferably is also capable of processing data input from the computer into output data.

The invention itself, together with further objects and attendant advantages, will best be understood by reference to the following detailed description taken in conjunction with the accompanying drawings.

DETAILED DESCRIPTION OF THE INVENTION

Figure 1:
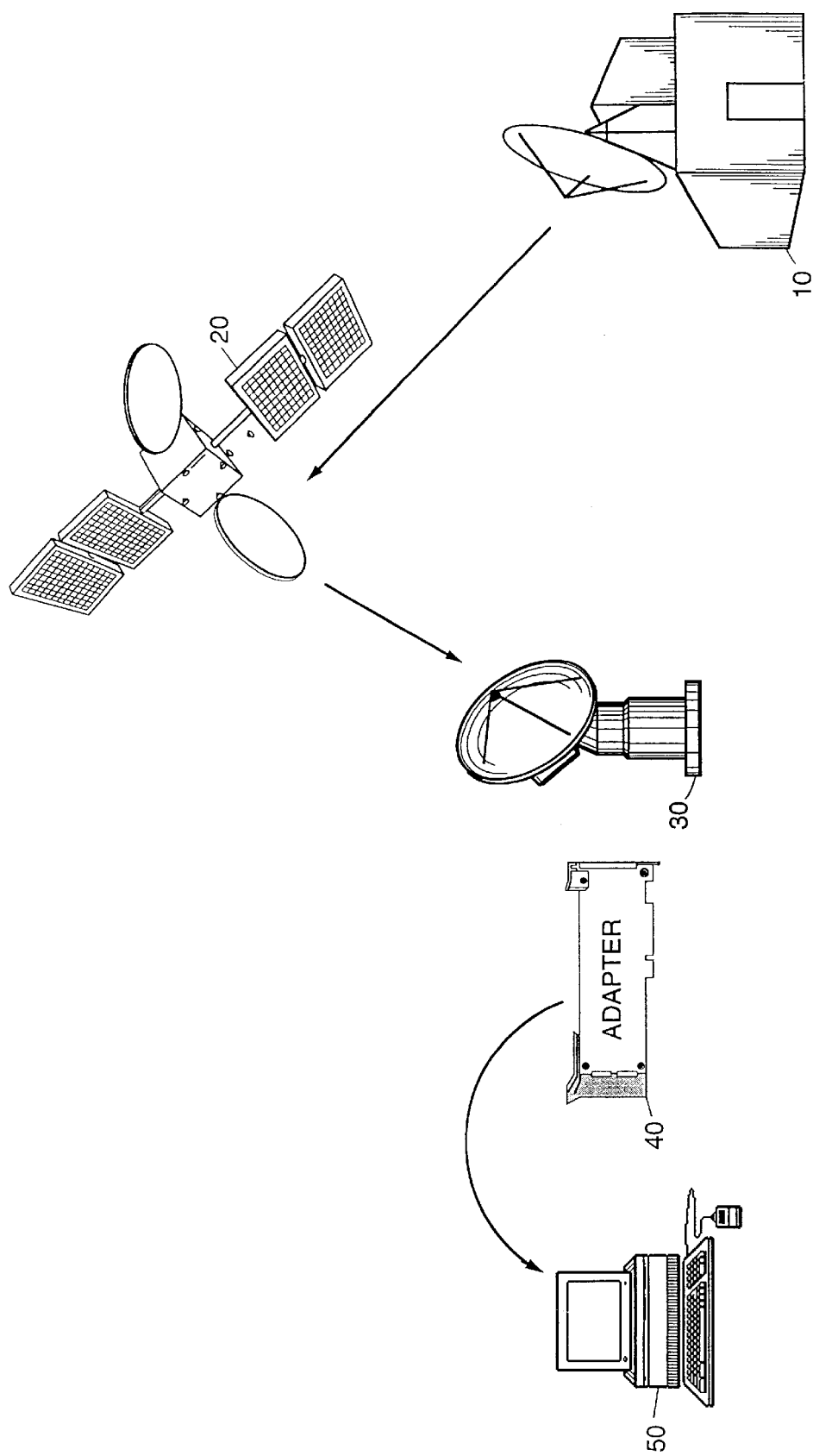
FIG. 1 is an illustration of one form of satellite broadcast system in which the present invention may be implemented.

It is envisioned that the present invention will be used in conjunction with a satellite broadcast system such as that shown in FIG. 1. As illustrated, this system includes a network operations center (NOC) 10, satellites 20, antenna receivers 30, adapter card receivers 40 (adapter cards), and computers 50.

In this system, a subscriber, through an adapter card 40 inserted in a computer 50, receives information in data streams broadcast via satellite 20. The data streams are uplinked to one or more communications satellites 20 by the NOC 10 from a large antenna broadcast earth station. Each data stream is broadcast in units of frames, with each frame including an address header for identifying the data stream, a data field containing data, and a CRC tail for ensuring accurate transmission. Preferably, the frames are encrypted, and the key needed to decrypt the data of a frame is identified by its address header. Accordingly, data can be accessed only by receivers having the proper key.

Each antenna receiver 30, comprising a smaller antenna and low-noise block (LNB) element, receives the broadcast frames and transmits the frames to a connected adapter card 40 inserted in the subscriber's computer 50. Because the subscriber may have access to only a subset of the broadcast data streams, the adapter card 40 screens incoming frames, and processes only those frames the subscriber is authorized to receive by using the frame address field to retrieve the corresponding key for decrypting each frame. The adapter card 40 then transmits the decrypted frames through a bus interface to the computer 50.

The present invention is directed to the adapter card 40, which provides the conditional access to incoming data streams, and preferably enables concurrent reception of multiple-data streams. By processing only authorized frames and discarding all others, the present invention prevents unauthorized frames from ever being passed to the computer 50. This not only prevents subscribers from illicitly accessing the decrypted data stream, but also provides a physical measure of security by preventing the encrypted data stream from being made available to be downloaded into the computer 50. This is an important feature because security mechanisms have been evaded by downloading encrypted data, as once the encrypted data stream is stored in the computer memory, the user can access the data for as many attempts as needed for decryption.

By evaluating and decrypting incoming data streams on a frame-by-frame basis, the present invention enables simultaneous reception of multiple conditional access controlled data streams statistically multiplexed in a received signal. Furthermore, because the present invention further enables frames to be decrypted as they are received, the need for buffer RAMs required in prior systems to store incoming frames can be substantially reduced or eliminated, thereby lowering the cost of the systems.

As explained in greater detail below, the preferred embodiment of the present invention increases the security of the conditional access provided to the transmitted data streams by providing a secure management system for the decryption keys. More specifically, the preferred embodiment provides a system having at least two levels of encryption, in which the decryption keys are themselves encrypted and never appear to users in decrypted or human-intelligible form.

In the preferred embodiment, the adapter card 40 additionally provides the encrypting and decrypting capabilities of the adapter card 40 to be used by the computer 50 as a general purpose bulk data encryptor/decryptor, even while the adapter card 40 is concurrently processing received frames. Not only does this feature reduce the overall cost to the user by eliminating the need for a separate data encryption/decryption engine to handle computer data, it also permits the advantageous conditional access features of the present invention to be provided to data received by the adapter card 40 from the computer 50 via a number of possible sources, rather than from the satellite 20 alone.

Figure 2:
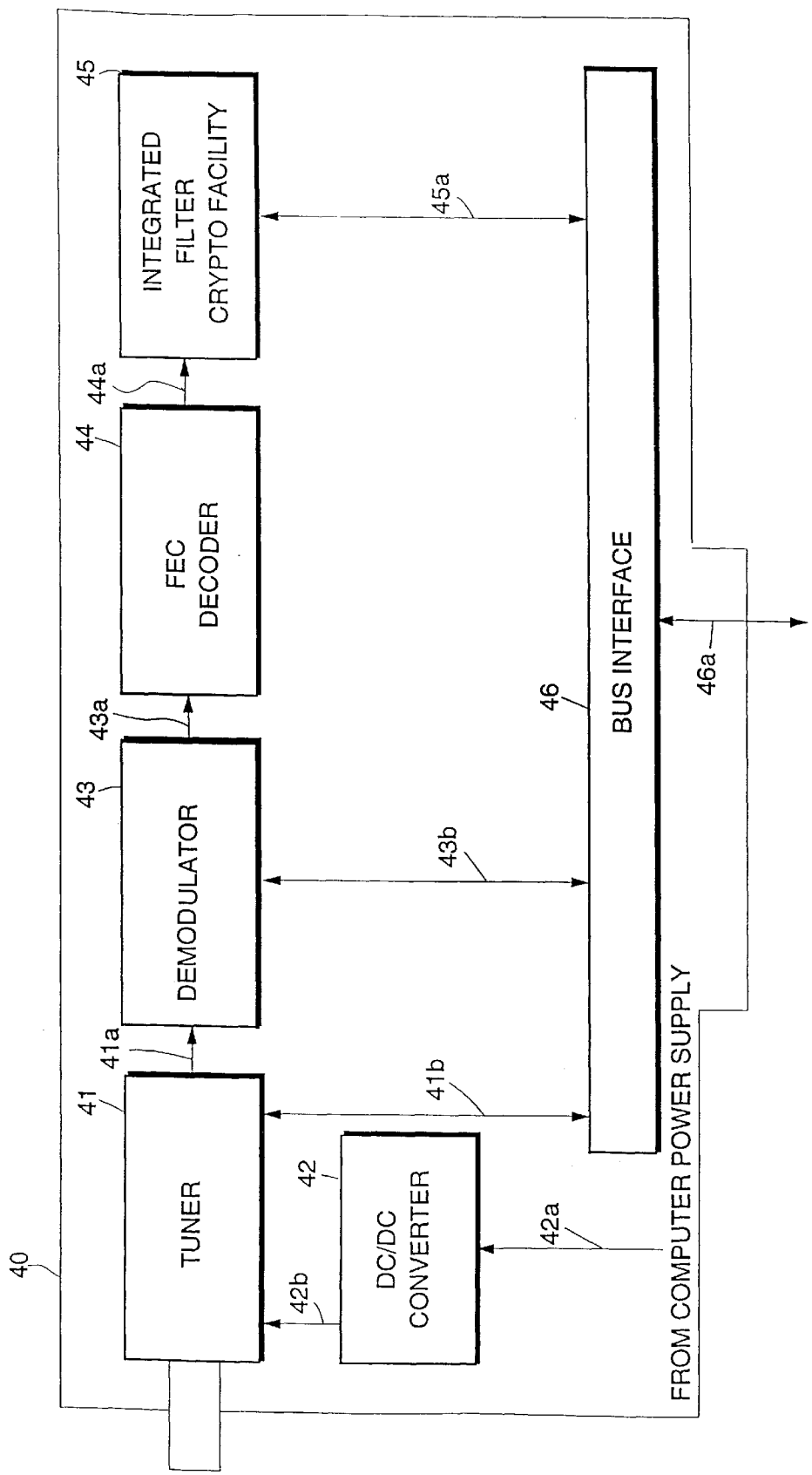
FIG. 2 is a block diagram of the preferred embodiment of the adapter card receiver of the present invention.

FIGS. 2 illustrates the adapter card 40 of the preferred embodiment, which includes the following functional blocks:

1. Front End Block 41, 42: connects the adapter card receiver 40 to the antenna receiver 30, for receiving a plurality of signals from the NOC 10 via the satellite 20 and transmitting data streams 41a from a particular signal selected by the tuner 41 to the Demodulator Block 43;
2. Demodulator Block 43: converts data streams 41a received on the selected signal into digital form and transmits the demodulated data stream 43a to the FEC Decoder Block 44;
3. FEC Decoder Block 44: identifies and corrects transmission errors in the demodulated data stream 43a and transmits the corrected data stream 44a to the Integrated Filter/Crypto Block 45;
4. Integrated Filter/Crypto Block 45: identifies frames within the received data stream 44a and decrypts frames of the accessible data streams; and
5. Bus Interface Block 46: enables communication between the adapter card 40 and the computer 50.

1. Front End Block

In the preferred embodiment, as illustrated in FIG. 2, the Front End Block includes a tuner 41, which can be set to receive an IF signal in 100 kHz steps in the frequency range of 950 to 1450 MHz, and downconverts the received signal to an IF output centered at 60 MHz. The operation of the tuner 41 can be controlled 41b by the computer 50 through the Bus Interface Block 46, or in a preferred embodiment, a local microprocessor may be provided on the adapter card 40 to monitor and control the tuner 41.

The Front End Block preferably also comprises a DC-DC converter 42, to provide all power required by the tuner 41 as well as the attached LNB by converting a +5 V signal 42a received from the computer power supply to voltages required by the various components (e.g., 42b).

2. Demodulator Block

The Demodulator Block 43 receives and demodulates the downconverted signal 41a from the Front End Block. In the preferred embodiment, the Demodulator Block 43 is implemented in a CMOS ASIC, and, through control 43b by the computer 50 or an adapter card microprocessor, provides all baseband signal processing required for demodulation.

3. FEC Decoder Block

The FEC Decoder Block 44 uses redundant data in the demodulated digital data stream 43a to identify and correct transmission errors. In the preferred embodiment, FEC Decoder Block 44 consists of a Viterbi soft-decision decoder, depuncture logic which allows the rate ½ Viterbi to operate at an effective rate of ⅔, a deinterleaver which scatters the errors resulting from the incorrect attempts to correct data, and a Reed-Solomon decoder capable of correcting the scattered errors.

4. Integrated Filter and Crypto Facility Block

The Integrated Filter and Crypto Facility (IFC) Block 45 plays a primary role in enabling the inventive conditional access features provided.

The IFC 45 receives frames of the digital data streams 44a, which are preferably encrypted. In the preferred embodiment, the standard DES algorithm is used, although alternative encryption algorithms are possible as well.

There are numerous methods by which users can acquire decryption keys, and the present invention can be adapted for use with any of these methods. For example, a subscriber can obtain a "smart card" from the service provider, typically a credit-card sized card readable by the computer. In some cases, the information provider can send information that passes into the smart card to generate the decryption keys. Another method is to obtain the keys through messages received from the satellite link or over a terrestrial communications system (e.g., via a modem connected to the computer). Still another method is for the subscriber to obtain the keys orally from the information provider and to manually enter the keys into the computer through the keyboard input.

The security of the present invention can be maintained with any of these systems because it does not depend solely on the security of the actual transmission of the keys. Rather, the security system of the present invention has multiple levels of security. At a first level, to receive any satellite data stream, a user must subscribe to the service provider and must obtain the necessary wiring and equipment. At the next level, security is enhanced by means of "groups." Each group comprises a set of data streams, and a subscriber must have access to a particular group in order to receive any of its data streams. Finally, in the preferred embodiment, an additional level may be provided by requiring subscribers to have specific authorization to receive each individual data stream within a group.

The present invention implements this tiered conditional access system through key management. Users become subscribers by subscribing to the service provider and obtaining an adapter card receiver 40, having an IFC 45, to be inserted into a computer 50. In the preferred embodiment, the IFC 45 is physically secured by implementation in an ASIC, which is equipped with a burned-in Master Key used for identification purposes. In the preferred embodiment, a unique Master Key is used for each IFC 45.

Preferably, to enhance the security of the conditional access features provided, the Master Key is used for subscriber identification rather than decryption. Accordingly, each adapter card 40 is also assigned a unique User Key which is encrypted with the Master Key before being distributed to the subscriber, and is decrypted only within the IFC 45. This prevents the User Key from ever appearing in unencrypted form, even to the subscriber. Use of the User Key rather than the Master Key allows the Master Key to be kept physically secure within the ASIC and minimizes its use, thereby minimizing its exposure. Consequently, the only method of compromising the security of the Master Key is by breaking the algorithm used to encrypt the User Key or by compromising the physical security of the IFC 45. Furthermore, the security of the overall system can be maintained through key distribution by simply changing a subscriber's User Key. This avoids the need for physical replacement of the IFC 45 even if the security of the User Key is compromised.

In the preferred embodiment having group access requirements, the function of the User Key is to decrypt Group Keys. A subscriber wanting to access any data stream within a particular group must have the Group Key for that group. A Group Key can be distributed to subscribers by any appropriate means with little risk to the security of the system because the entity providing distribution of Group Keys will encrypt a Group Key with the subscriber's unique User Key before transmission. Accordingly, the Group Key can be decrypted only by the IFC 45 of the subscriber for which it is intended, minimizing the likelihood that it will be distributed to and successfully used by an unauthorized user. Furthermore, even the authorized subscriber will never have access to the decrypted Group Key, because the Group Key is encrypted by the User Key until decrypted within the physically secure IFC ASIC, and as described above, the subscriber does not have access to the User Key.

In the preferred embodiment, the only function of a Group Key is to decrypt Data Keys for the data streams within the group. As discussed, because a subscriber must be a member of a group to access any of the data streams within the group, only subscribers having the appropriate Group Key can decrypt the Data Key. Additionally, because each Data Key is encrypted with its Group Key before being distributed to subscribers, in order to access and decrypt a particular data stream within a group, the subscriber must have the appropriate Data Key for that data stream.

The combination of the Group Keys and the Data Keys determine the subscriber's accessibility to the incoming data streams, and must be kept current. In the preferred embodiment, an Access Table is stored in adapter card memory outside of the IFC 45, with entries corresponding to data streams the subscriber is authorized to receive. Each entry accordingly has fields for an address of a data stream the subscriber is authorized to access, and a Group Key and a Data Key required to decrypt that data stream. Because this table is located outside the IFC 45, the Group and Data Keys are stored in encrypted form in the Access Table. A microprocessor is preferably provided on the adapter card 40 outside the IFC 45 to perform the table functions and to indicate to the IFC 45 whether a particular address matches a table entry, and also to indicate the appropriate key, if a match is found.

In the preferred embodiment, other aspects of the key management system are implemented within the IFC ASIC. For example, logic is provided for maintaining and storing current keys, as well as for handling data in both encrypted and decrypted form. As earlier noted, the IFC 45 in a preferred embodiment provides decryption functions for incoming frames as well as encryption and decryption functions for bulk data from the computer 50. To provide these features, the ASIC logic includes at least the following subblocks:

UK Register, for storing the User Key of the subscriber, which as described above, is decrypted by the Master Key as it is loaded into the IFC 45;

GK Register, for storing a single Group Key. Although a subscriber may have access to more than one group, as described above, the preferred embodiment provides an access table outside the IFC 45 for storing the Group Keys in encrypted form. When the IFC 45 receives an encrypted frame, it extracts the data stream address, and if the address matches one of the access table entries, the appropriate Group Key is decrypted by the User Key as it is loaded into the IFC 45;

DK Register, for storing a Data Key to decrypt input data, whether satellite data or computer data;

an encryption/decryption engine, for performing the actual decryption of satellite data, or encryption or decryption of computer data from other sources;

Input Registers, for storing input yet to be processed, preferably including at least one register specifically designated for satellite data and at least one register specifically designated for computer data;

Opcode Registers, for indicating the location of the appropriate key for a particular operation and the location where the output should be stored, preferably including at least one register specifically designated for satellite data and at least one register specifically designated for computer data; and Output Registers, preferably including at least one register specifically designated for satellite data and at least one register specifically designated for computer data from other sources.

In the preferred embodiment, the logic is implemented to provide functions for loading Group Keys, loading Data Keys, processing satellite data, and processing computer data. The Load Group Key function is used to provide the IFC 45 with the necessary Group Key for decryption, when the address of a received frame matches an address stored in the access table. Input to the Load Group Key function is a Group Key encrypted by the User Key. When the IFC 45 receives this instruction, it retrieves the User Key from the UK Register to decrypt the received Group Key, and stores the decrypted Group Key in the GK Register.

A Load Data Key instruction indicates to the IFC 45 that the input is a Data Key encrypted by a Group Key. In response, the IFC 45 will decrypt the input with the Group Key stored in the GK Register and store the resulting decrypted Data Key in the DK Register.

When the IFC 45 receives a Process Satellite Data instruction, the input contains an incoming satellite data stream frame. The IFC 45 locates the address in the address header of the frame and determines whether it has the Data Key necessary for decryption by searching the access table for the frame address. If a match is found, the IFC 45 will retrieve the appropriate Group and Data Keys, decrypt the frame and store the decrypted frame in an Output Buffer for satellite data; if not, the IFC 45 will discard the frame.

Process Computer Data instructions are handled similarly. As previously noted, in the preferred embodiment, the IFC encryption/decryption engine is capable of encrypting and decrypting data from other sources, transmitted by the computer 50. To enable operations to be simultaneously performed on both incoming satellite frames as well as incoming computer data, the IFC 45 time shares between frame reception and data encryption and decryption operations. To process computer data, the computer 50 must transmit the key to be used, an indication of whether the key is to be used for encryption or decryption, and the data on which the operation is to be performed. Based on this input, the IFC 45 will perform the appropriate operation on the data and return the processed data to the attached computer 50 via the Bus Interface Block 46.

Thus, unlike systems described in prior art which simply transmit incoming data streams into the computer 50, the IFC 45 of the present invention allows the computer 50 only conditional access to received data streams. In particular, only authorized signals are ever downloaded into the computer 50. The preferred embodiment provides enhanced security by ensuring that none of the keys required at any level of decryption ever appears outside the IFC ASIC in decrypted form, and by providing multiple layers of security. These layers not only make unauthorized access more difficult, but by implementing the layers in the key management system, they also enable a fast, simple method to recover from most security problems. More specifically, in response to problems due to an unauthorized user obtaining a User Key assigned to an authorized subscriber, a new User Key can be distributed to that subscriber. Similarly, in response to security problems caused by unauthorized access to particular data streams, the data stream and group keys required for decrypting those data streams can be changed, and the updated keys provided only to authorized users.

Besides security, the IFC 45 provides data management benefits by efficiently using memory and computer processing time, which is especially useful in downloading large files. The present invention filters incoming data stream frames by determining whether the computer is authorized to receive the frame based on its address, accepting only authorized frames. This significantly reduces the adapter memory requirements, since individual frames are decrypted as they are received rather than requiring encrypted frames to be buffered in their entirety awaiting decryption. This feature may eliminate the need for buffering frames on the adapter entirely, eliminating the need for buffers on the adapter card 40 and providing a significant cost reduction.

Yet another advantage provided by the IFC 45 of the present invention is that, by providing address-based frame decryption, the adapter card 40 can simultaneously decrypt multiple data streams that are statistically multiplexed on the same broadcast signal.

One skilled in the art will recognize that variations for providing the required capabilities of the IFC 45. For example, although the preferred embodiment is implemented with the three level security scheme described above, the present invention may be implemented with only two levels of security by providing only the User Keys and the Data Keys. In this case, the User Key serves the same purpose as in the three-level scheme, but the Data Keys will be provided to the adapter card 40 encrypted in the User Key rather than in a Group Key. Other levels of security may likewise be used without departing form the claimed invention.

5. Bus Interface Block

The Bus Interface Block 46 enables communication 46a between the computer and the adapter card 40 for, among other things, controlling and monitoring the tuner 41 and the demodulator 43 and maintaining the key management system. Additionally, the Bus Interface Block 46 allows the attached computer 50 to obtain decrypted frames from the IFC Block 46, and to pass bulk data to the IFC 46 for encryption or decryption and receive the resulting processed data. After performing the required operation on incoming-data, one implementation buffers the resulting data in memory provided on the adapter card 40, and interrupts the attached computer 50 for retrieval. Alternatively, in a preferred embodiment, the Bus Interface Block 46 automatically reads the decrypted data into the memory of the attached computer 50.

The present invention, as illustratively embodied in the preferred embodiment described above, provides an adapter card receiver 40, to be used in conjunction with a connected computer 50, for enabling users to conditionally access and quickly download multiple data streams, such as signals transmitted via satellite 20. The invention also maintains the security of privileged information by preventing the information to enter the computer of unauthorized users.

However, it should be understood that a wide range of changes and modifications can be made to the preferred embodiment described above. It is therefore intended that the foregoing detailed description be illustrative rather than limiting, and that it is the following claims, including all equivalents, which are intended to define the scope of this invention.

What is claimed is:

1. An apparatus comprising:
   a receiving unit configured to receive frames from a satellite antenna, wherein each frame corresponds to one of a plurality of different data streams, wherein each of the plurality of different data streams is encrypted with a different key, and wherein each frame comprises (a) identifying information uniquely identifying that one of the plurality of different data streams to which the frame corresponds and (b) encrypted data for decryption using a key obtained in accordance with the identifying information; and an output unit configured to determine in accordance with the identifying information of a frame received by said receiving unit whether or not a key is available to decrypt the encrypted data of the frame, and where available to output decrypted data, obtained from the encrypted data of the frame by using the key, through a bus interface to a computer for further processing by the computer.

2. An apparatus according to claim 1, wherein said apparatus is an adapter card connectable to the computer.

3. An apparatus according to claim 1, wherein said output unit interrupts the computer to inform the computer that the decrypted data is ready to be retrieved by the computer.

4. An apparatus according to claim 1, wherein where a key is not available to decrypt the encrypted data of the frame, the encrypted data of the frame is prevented from being output to the computer.

5. An apparatus according to claim 1, wherein the key is stored in said apparatus in a decrypted form only within an ASIC of said apparatus.

6. An apparatus according to claim 1, wherein said receiving unit receives frames from the satellite antenna by receiving a signal in which frames of the plurality of different data streams are multiplexed.

7. An apparatus according to claim 1, wherein said output unit determines in accordance with the identifying information of a frame received by said receiving unit whether or not a key is available to decrypt the encrypted data of the frame by comparing the identifying information to stored information providing a correspondence between identifying information and a key used to decrypt the encrypted data of the frame.

8. An apparatus according to claim 7, wherein the stored information is provided in a table having plural entries, each entry providing a correspondence between identifying information and a key used to decrypt the encrypted data of the frame, and each entry corresponding to a respective one of a plurality of different data streams.

9. A method comprising:

receiving frames from a satellite antenna, wherein each frame corresponds to one of a plurality of different data streams, wherein each of the plurality of different data streams is encrypted with a different key, and wherein each frame comprises (a) identifying information uniquely identifying that one of the plurality of different data streams to which the frame corresponds and (b) encrypted data for decrytion using a key obtained in accordance with the identifying information;

determining in accordance with the identifying information of a frame receiving in said receiving step whether or not a key is available to decrypt the encrypted data of the frame, and where available outputting decrypted data, obtained from the encrypted data of the frame by using the key, through a bus interface to a computer for further processing by the computer.

10. A method according to claim 9, wherein said method is effected by an adapter card connectable to the computer.

11. A method according to claim 9, wherein said outputting step comprises a step of interrupting the computer to inform the computer that the decrypted data is ready to be retrieved by the computer.

12. A method according to claim 9, wherein where a key is not available to decrypt the encrypted data of the frame, the encrypted data of the frame is prevented from being output to the computer.

13. A method according to claim 9, wherein the key is stored in an apparatus used to effect said method in a decrypted form only within an ASIC of the apparatus.

14. A method according to claim 9, wherein said receiving unit receives frames from the satellite antenna by receiving a signal in which frames of the plurality of different data streams are multiplexed.

15. A method according to claim 9, wherein said determining step determines in accordance with the identifying information of a frame received by said receiving step whether or not a key is available to decrypt the encrypted data of the frame by comparing the identifying information to stored information providing a correspondence between identifying information and a key used to decrypt the encrypted data of the frame.

16. A method according to claim 15, wherein the stored information is provided in a table having plural entries, each entry providing a correspondence between identifying information and a key used to decrypt the encrypted data of the frame, and each entry corresponding to a respective one of a plurality of different data streams.

17. An apparatus comprising:

a receiving unit configured to receive frames from a satellite antenna, wherein each frame corresponds to one of a plurality of different data streams, wherein each of the plurality of different data streams is encrypted with a different key, and wherein each frame comprises (a) identifying information uniquely identifying that one of the plurality of different data streams to which the frame corresponds and (b) encrypted data for decryption using a key obtained in accordance with the identifying information; and a determining unit configured to determine accordance with the identifying information of a frame whether or not a key is available to decrypt the encrypted data of the frame, wherein said apparatus is an adapter card connectable to a computer.

18. An apparatus according to claim 17, wherein where a key is not available to decrypt the encrypted data of the frame, the encrypted data of the frame is prevented from being output to the computer.

19. An apparatus according to claim 17, wherein the key is stored in said apparatus in a decrypted form only within an ASIC of said apparatus.

20. An apparatus according to claim 17, wherein said receiving unit receives frames from the satellite antenna by receiving a signal in which frames of the plurality of different data streams are multiplexed.

21. An apparatus according to claim 17, wherein said determining unit determines in accordance with the identifying information of a frame received by said receiving unit whether or not a key is available to decrypt the encrypted data of the frame by comparing the identifying information to stored information providing a correspondence between identifying information and a key used to decrypt the encrypted data of the frame.

22. An apparatus according to claim 21, wherein the stored information is provided in a table having plural entries, each entry providing a correspondence between identifying information and a key used to decrypt the encrypted data of the frame, and each entry corresponding to a respective one of a plurality of different data streams.

23. A method comprising:

receiving frames from a satellite antenna, wherein each frame corresponds to one of a plurality of different data streams, wherein each of the plurality of different data streams is encrypted with a different key, and wherein each frame comprises (a) identifying information uniquely identifying that one of the plurality of different data streams to which the frame corresponds and (b) encrypted data for decryption using a key obtained in accordance with the identifying information; and determining in accordance with the identifying information of a frame received by said receiving step whether or not a key is available to decrypt the encrypted data of the frame, wherein said method is effected by using an adapter card connectable to a computer.

24. A method according to claim 23, wherein where a key is not available to decrypt the encrypted data of the frame, the encrypted data of the frame is prevented from being output to the computer.

25. A method according to claim 23, wherein the key is stored in an apparatus used to effect said method in a decrypted form only within an ASIC of the apparatus.

26. A method according to claim 23, wherein said receiving step receives frames from the satellite antenna by receiving a signal in which frames of the plurality of different data streams are multiplexed.

27. A method according to claim 23, wherein said determining step determines in accordance with the identifying information of a frame received by said receiving step whether or not a key is available to decrypt the encrypted data of the frame by comparing the identifying information to stored information providing a correspondence between identifying information and a key used to decrypt the encrypted data of the frame.

28. A method according to claim 27, wherein the stored information is provided in a table having plural entries, each entry providing a correspondence between identifying information and a key used to decrypt the encrypted data of the frame, and each entry corresponding to a respective one of a plurality of different data streams.

29. An apparatus comprising:

a receiving unit configured to receive frames from a satellite antenna, wherein each frame corresponds to one of a plurality of different data streams, and wherein each frame comprises (a) identifying information uniquely identifying that one of the plurality of different data streams to which the frame corresponds and (b) encrypted data for decryption using one of a plurality of different keys, the one key being obtained in accordance with the identifying information; and an output unit configured to determine in accordance with the identifying information of a frame received by said receiving unit whether or not a key is available to decrypt the encrypted data of the frame, and where available to output decrypted data, obtained from the encrypted data of the frame by using the key, through a bus interface to a computer for further processing by the computer.

30. An apparatus comprising:

a receiving unit configured to receive frames from a satellite antenna, wherein each frame corresponds to one of a plurality of different data streams, and wherein each frame comprises (a) identifying information uniquely identifying that one of the plurality of different data streams to which the frame corresponds and (b) encrypted data for decryption using one of a plurality of different keys, the one key being obtained in accordance with the identifying information; and a determining unit configured to determine accordance with the identifying information of a frame whether or not a key is available to decrypt the encrypted data of the frame, wherein said apparatus is an adapter card connectable to a computer.

* * * * *